US009154247B2

(12) United States Patent
Altman (10) Patent No.: US 9,154,247 B2
(45) Date of Patent: Oct. 6, 2015

(54) LIVE UPLINK TRANSMISSIONS AND BROADCASTING MANAGEMENT SYSTEM AND METHOD

(75) Inventor: Baruch Yosef Altman, Pardes Hanna (IL)

(73) Assignee: LIVEU LTD., Kfar Saba (IL)

( * ) Notice: Subject to any disclaimer, the term of this patent is extended or adjusted under 35 U.S.C. 154(b) by 835 days.

(21) Appl. No.: 12/863,723

(22) PCT Filed: Jan. 25, 2009

(86) PCT No.: PCT/IL2009/000099
§ 371 (c)(1),
(2), (4) Date: Jul. 20, 2010

(87) PCT Pub. No.: WO2009/093252
PCT Pub. Date: Jul. 30, 2009

(65) Prior Publication Data
US 2010/0299703 A1 Nov. 25, 2010

Related U.S. Application Data (60) Provisional application No. 61/006,581, filed on Jan. 23, 2008.

(51) Int. Cl.
*H04N 21/63* (2011.01)
*H04H 60/04* (2008.01)
(Continued)

(52) U.S. Cl.
CPC ........... *H04H 60/04* (2013.01); *H04N 21/2187* (2013.01); *H04N 21/2543* (2013.01);
(Continued)

(58) Field of Classification Search
None
See application file for complete search history.

(56) References Cited

U.S. PATENT DOCUMENTS 5,280,470 A 1/1994 Buhrke et al.
5,699,413 A 12/1997 Sridhar
(Continued)

FOREIGN PATENT DOCUMENTS

EP 1863304 A1 12/2007
EP 2824945 A1 1/2015
(Continued)

OTHER PUBLICATIONS

European Patent Application # 09704224.6 Official Action dated Nov. 17, 2011.
(Continued)

*Primary Examiner* — Cai Chen
(74) *Attorney, Agent, or Firm* — D. Kliger I.P. Services Ltd.

(57) ABSTRACT

A live uplink transmission and broadcasting management system and method for managing a plurality of live uplink transmissions and broadcasting events, the system comprising: (i) a publication portal for publishing transmissions of live events; (ii) a database for storing metadata, system data, broadcast data and user data; (iii) a broadcast manager adapted for receiving and processing in real-time metadata information related to a plurality of live uplink transmission events wherein each live uplink transmission event transmits in a plurality of uplink channels, wherein processed metadata information generate data elements adapted for being used in telecom and datacom real time management applications, said broadcast manager also adapted for updating the publication portal with live event information and (iv) a set of Quality of Service (QoS) management methods to coordinate the usage of Uplink transmissions based on the received metadata and their processing in the broadcast manager.

45 Claims, 3 Drawing Sheets

(51) Int. Cl.
*H04N 21/2187* (2011.01)
*H04N 21/2543* (2011.01)
*H04N 21/262* (2011.01)
*H04N 21/6371* (2011.01)
*H04N 21/8405* (2011.01)
*H04H 20/04* (2008.01)
*H04H 60/72* (2008.01)
*H04H 60/73* (2008.01)

(52) U.S. Cl.
CPC ..... *H04N21/26283* (2013.01); *H04N 21/6371* (2013.01); *H04N 21/8405* (2013.01); *H04H 20/04* (2013.01); *H04H 60/72* (2013.01); *H04H 60/73* (2013.01)

(56) References Cited

U.S. PATENT DOCUMENTS

| | | | |
|---|---|---|---|
| 5,771,229 A | 6/1998 | Gavrilovich | |
| 6,154,637 A | 11/2000 | Wright et al. | |
| 6,253,247 B1 | 6/2001 | Bhaskar et al. | |
| 6,288,753 B1 | 9/2001 | DeNicola et al. | |
| 6,496,477 B1 | 12/2002 | Perkins | |
| 6,510,553 B1 | 1/2003 | Hazra | |
| 6,647,015 B2 | 11/2003 | Malkemes et al. | |
| 6,683,877 B1 | 1/2004 | Gibbs et al. | |
| 6,754,872 B2 | 6/2004 | Zhang et al. | |
| 6,757,256 B1 | 6/2004 | Anandakumar et al. | |
| 6,774,926 B1* | 8/2004 | Ellis et al. ............ | 348/14.01 |
| 6,785,330 B1 | 8/2004 | Whealton et al. | |
| 6,788,686 B1 | 9/2004 | Khotimsky et al. | |
| 6,831,574 B1 | 12/2004 | Mills et al. | |
| 6,842,446 B2 | 1/2005 | Everson et al. | |
| 6,904,049 B1 | 6/2005 | Maeda | |
| 6,963,279 B1 | 11/2005 | Martinelli et al. | |
| 6,987,732 B2 | 1/2006 | Gracon et al. | |
| 6,999,432 B2 | 2/2006 | Zhang et al. | |
| 7,013,354 B1 | 3/2006 | Beck et al. | |
| 7,027,415 B1 | 4/2006 | Dahlby et al. | |
| 7,039,930 B1* | 5/2006 | Goodman et al. .......... | 725/22 |
| 7,082,221 B1 | 7/2006 | Jiang | |
| 7,151,762 B1 | 12/2006 | Ho et al. | |
| 7,237,032 B2 | 6/2007 | Gemmell | |
| 7,237,033 B2 | 6/2007 | Weigand et al. | |
| 7,292,571 B2 | 11/2007 | Brown | |
| 7,317,750 B2 | 1/2008 | Shattil | |
| 7,324,491 B1 | 1/2008 | Benveniste et al. | |
| 7,340,764 B2 | 3/2008 | Kubota et al. | |
| 7,542,456 B2 | 6/2009 | Garg et al. | |
| 7,551,671 B2 | 6/2009 | Tyldesley et al. | |
| 7,738,391 B2 | 6/2010 | Melpignano et al. | |
| 7,894,807 B1 | 2/2011 | Drennan | |
| 7,948,933 B2 | 5/2011 | Ohayon et al. | |
| 8,165,044 B2 | 4/2012 | Mahajan et al. | |
| 8,204,085 B1 | 6/2012 | Courtney et al. | |
| 8,467,337 B1 | 6/2013 | Ohayon et al. | |
| 8,488,659 B2 | 7/2013 | Ohayon et al. | |
| 8,649,402 B2 | 2/2014 | Ohayon et al. | |
| 2002/0040479 A1 | 4/2002 | Ehrman et al. | |
| 2002/0054578 A1 | 5/2002 | Zhang et al. | |
| 2002/0071393 A1 | 6/2002 | Musoll | |
| 2002/0143565 A1 | 10/2002 | Headings et al. | |
| 2002/0146232 A1* | 10/2002 | Harradine et al. .......... | 386/46 |
| 2002/0154703 A1 | 10/2002 | Kubota et al. | |
| 2002/0174434 A1 | 11/2002 | Lee et al. | |
| 2002/0176482 A1 | 11/2002 | Chien | |
| 2003/0002577 A1 | 1/2003 | Pinder | |
| 2003/0016770 A1 | 1/2003 | Trans et al. | |
| 2003/0046708 A1 | 3/2003 | Jutzi | |
| 2003/0051041 A1 | 3/2003 | Kalavade et al. | |
| 2003/0055971 A1* | 3/2003 | Menon ................ | 709/226 |
| 2003/0061503 A1 | 3/2003 | Katz et al. | |
| 2003/0074554 A1 | 4/2003 | Roach et al. | |
| 2003/0146940 A1* | 8/2003 | Ellis et al. ................. | 345/811 |
| 2003/0159143 A1 | 8/2003 | Chan | |
| 2003/0174733 A1 | 9/2003 | Kawai et al. | |
| 2004/0013192 A1 | 1/2004 | Kennedy | |
| 2004/0023652 A1 | 2/2004 | Shah et al. | |
| 2004/0025186 A1 | 2/2004 | Jennings et al. | |
| 2004/0098748 A1* | 5/2004 | Bo et al. .................. | 725/105 |
| 2004/0133907 A1* | 7/2004 | Rodriguez et al. .......... | 725/14 |
| 2004/0133917 A1 | 7/2004 | Schilling | |
| 2004/0135879 A1 | 7/2004 | Stacey et al. | |
| 2004/0177155 A1 | 9/2004 | Enokida et al. | |
| 2004/0180696 A1 | 9/2004 | Foore et al. | |
| 2005/0034155 A1 | 2/2005 | Gordon et al. | |
| 2005/0035368 A1 | 2/2005 | Bunyk | |
| 2005/0041586 A1 | 2/2005 | Jiang | |
| 2005/0047363 A1 | 3/2005 | Jiang | |
| 2005/0105815 A1 | 5/2005 | Zhang et al. | |
| 2005/0122914 A1 | 6/2005 | Durso et al. | |
| 2005/0125670 A1 | 6/2005 | Sozzani et al. | |
| 2005/0183109 A1* | 8/2005 | Basson et al. ............... | 725/4 |
| 2005/0265383 A1 | 12/2005 | Melpignano et al. | |
| 2006/0015917 A1 | 1/2006 | Rozental | |
| 2006/0015924 A1 | 1/2006 | Kortum et al. | |
| 2006/0062242 A1 | 3/2006 | Dacosta | |
| 2006/0062243 A1 | 3/2006 | Dacosta | |
| 2006/0085551 A1 | 4/2006 | Xie et al. | |
| 2006/0146831 A1 | 7/2006 | Argyropoulos et al. | |
| 2006/0221846 A1 | 10/2006 | Dyck et al. | |
| 2006/0264184 A1 | 11/2006 | Li et al. | |
| 2006/0274773 A1 | 12/2006 | Cohen et al. | |
| 2007/0083899 A1* | 4/2007 | Compton et al. ............ | 725/87 |
| 2007/0098007 A1 | 5/2007 | Prodan et al. | |
| 2007/0121678 A1 | 5/2007 | Brooks et al. | |
| 2007/0136777 A1 | 6/2007 | Hasek et al. | |
| 2007/0204321 A1 | 8/2007 | Shen et al. | |
| 2007/0207832 A1 | 9/2007 | Gerardi et al. | |
| 2007/0230475 A1 | 10/2007 | Langner | |
| 2007/0247515 A1 | 10/2007 | Roman | |
| 2007/0263072 A1 | 11/2007 | Lochbaum et al. | |
| 2007/0268876 A1 | 11/2007 | Yellin et al. | |
| 2008/0025210 A1 | 1/2008 | Honary et al. | |
| 2008/0034396 A1 | 2/2008 | Lev | |
| 2008/0120676 A1 | 5/2008 | Morad et al. | |
| 2008/0295159 A1 | 11/2008 | Sentinelli | |
| 2008/0310371 A1 | 12/2008 | Russell | |
| 2009/0006848 A1 | 1/2009 | Adrangi et al. | |
| 2009/0138925 A1 | 5/2009 | Headings et al. | |
| 2009/0163175 A1 | 6/2009 | Shi et al. | |
| 2009/0270129 A1 | 10/2009 | Kuo et al. | |
| 2010/0045791 A1 | 2/2010 | Drive et al. | |
| 2010/0210304 A1 | 8/2010 | Huslak | |
| 2010/0227588 A1 | 9/2010 | Bradley | |
| 2010/0248690 A1 | 9/2010 | Biggs et al. | |
| 2010/0273424 A1 | 10/2010 | De Petris et al. | |
| 2010/0311391 A1 | 12/2010 | Siu et al. | |
| 2010/0311468 A1 | 12/2010 | Shi et al. | |
| 2010/0322259 A1 | 12/2010 | Garg et al. | |
| 2011/0007693 A1 | 1/2011 | Frusina et al. | |
| 2011/0028135 A1 | 2/2011 | Srinivasan | |
| 2011/0051642 A1 | 3/2011 | Krishnaswamy | |
| 2011/0059773 A1 | 3/2011 | Neumann et al. | |
| 2011/0081951 A1 | 4/2011 | Hwang | |
| 2011/0115976 A1 | 5/2011 | Ohayon et al. | |
| 2011/0117909 A1 | 5/2011 | Cao et al. | |
| 2011/0151858 A1 | 6/2011 | Lai | |
| 2011/0154460 A1 | 6/2011 | Khare et al. | |
| 2011/0269456 A1 | 11/2011 | Krishnaswamy et al. | |
| 2012/0021744 A1 | 1/2012 | Chin et al. | |
| 2012/0135715 A1 | 5/2012 | Kang et al. | |
| 2012/0195259 A1 | 8/2012 | Ohayon et al. | |
| 2012/0219085 A1 | 8/2012 | Long et al. | |
| 2013/0029720 A1 | 1/2013 | Clevorn | |
| 2013/0094522 A1 | 4/2013 | Moshfeghi | |
| 2013/0155231 A1 | 6/2013 | Ohayon et al. | |
| 2013/0329639 A1 | 12/2013 | Wietfeldt et al. | |

FOREIGN PATENT DOCUMENTS

| | | |
|---|---|---|
| GB | 2428529 A | 1/2007 |
| JP | 2002010332 A | 1/2002 |
| JP | 2002344965 A | 11/2002 |

(56) References Cited

FOREIGN PATENT DOCUMENTS

| JP | 2003152787 | A | 5/2003 |
|---|---|---|---|
| JP | 2005065207 | A | 3/2005 |
| WO | 02063501 | A2 | 8/2002 |
| WO | 02089519 | A1 | 11/2002 |
| WO | 03098850 | A1 | 11/2003 |
| WO | 2005060300 | A1 | 6/2005 |
| WO | 2005109789 | A1 | 11/2005 |
| WO | 2011075739 | A1 | 6/2011 |
| WO | 2011101709 | A1 | 8/2011 |
| WO | 2012158850 | A1 | 11/2012 |

OTHER PUBLICATIONS

International Application PCT/IB2013/054551 Search Report dated Oct. 14, 2013.
International Application PCT/IB2013/053843 Search Report dated Aug. 21, 2013.
U.S. Appl. No. 13/886,050 Office Action dated Aug. 12, 2013.
U.S. Appl. No. 12/965,879 Office Action dated Aug. 29, 2013.
U.S. Appl. No. 13/921,227 Office Action dated Sep. 30, 2013.
U.S. Appl. No. 13/368,369 Office Action dated Aug. 29, 2013.
JP Application # 2013-191799 Office Action dated Apr. 30, 2014.
U.S. Appl. No. 13/921,227 Office Action dated Feb. 21, 2014.
EP Patent Application # 09704224.6 Office Action dated Feb. 3, 2014.
U.S. Appl. No. 13/713,001 Office Action dated Apr. 29, 2015.
European Application # 13729242.1 Search Report dated Apr. 13, 2015.
European Application # 09704224.6 Office Action dated May 8, 2015.
EP Patent Application # 12196907.5 Search Report dated Apr. 3, 2013.
Dejero, "Dejero Transforms Live Newsgathering", 6 pages, Jun. 7, 2010.
TVU Networks, "Sharp, glitch-free picture quality from a compact video news gathering backpack", 4 pages, May 6, 2011.
Altman, B.Y., International Application PCT/IB2013/054551 filed Jun. 3, 2013.
Altman, B.Y., International Application PCT/IB2013/053843 filed May 12, 2013.
Sklower et al., "The PPP Multilink Protocol (MP)", RFC1990, Network Working Group, 22 pages, Aug. 1996.
Conant, G.E., "Multilink PPP: One Big Virtual WAN Pipe", Published on Linux Journal (http://www.linuxjournal.com), 6 pages, Sep. 1, 1999.
PCWorld, "Do Web Accelerators Work", 4 pages, Jan. 27, 1999.
Cisco Systems Inc., "Multilink PPP for DDR—Basic Configuration and Verification", Document ID: 10239, 9 pages, Sep. 9, 2005.
Smith, K., "Ascend's Multilink Protocol Plus (MP+)", RFC 1934, Network Working Group, 48 pages, Apr. 1996.
U.S. Appl. No. 14/588,939 Office Action dated Jul. 16, 2015.

* cited by examiner

LIVE UPLINK TRANSMISSIONS AND BROADCASTING MANAGEMENT SYSTEM AND METHOD

TECHNICAL FIELD

The present invention relates to managing the transmissions and distribution of live multimedia content, and more particularly the system manages the uplink of live or semi-live single and multiple transmissions over wireless, cellular, Ethernet or any IP network, into TV, internet TV, IPTV or any other medium distributing content to consumers.

BACKGROUND ART

A virtual broadband system for the remote transport of live media data over a cellular network is described in the applicants co-pending patent application U.S. Ser. No. 11/845,071, incorporated herein by reference. 071 describes a system in which a video camera may be used to film events at a remote location.

A cable may connect camera to a virtual broadband upload unit, which may operate several cellular modems, WiFi modems, WiMax modems, or any other wireless modems to transmit media data through one or more cellular or any other wireless core networks, or even via a wireline Ethernet network. Each modem may generate a separate logical & physical channel and the multiple channels may constitute a virtual broadband connection. The combined upload capacity of virtual broadband connection may approximate that of a single, line of sight satellite or microwave connection.

From networks, the data may be transported to a virtual broadband receiver via Internet connections, leased lines connections, cellular network connections or any mix of the above connections. Virtual broadband receiver may be located within studio, which may then broadcast the data to televisions, to the Internet, etc.

Networks may be one or more cellular networks accessible from the remote location. It will be appreciated that one or more operators may provide such networks and that networks may also use more than one technology. Accordingly, it will be appreciated that virtual broadband connection may be comprised of a multiplicity of channels being transmitted to one or more network operators, each of which operator may be operating one or more networks of possibly different technologies.

Channels may be transported to virtual broadband receiver via a number of routes, including, for example, Internet connection, leased line connection and cellular network connection.

Although known systems may increase the efficiency of the transmission of live-broadcasts, the need remains for a system for managing and publishing the broadcasts for viewing. The present invention addresses this need

SUMMARY OF INVENTION

It is an object of the present invention to provide a management system for single and multiple live uplink transmissions and broadcasting for managing in real-time content transmitted from multiple sources.

It is another object of the present invention to provide a management system for single and multiple live uplink transmissions and broadcasting for managing in real-time content transmitted from multiple sources, and transmitted in the UpLink over multiple channels by each content source.

It is a further object of the present invention to provide a programming guide for real-time events.

It is yet another object of the present invention to process metadata received from real-time transmissions over one or more channels in order to provide relevant data to be used with Quality of Service (QoS) applications.

It is yet a further object of the present invention to process metadata received from real-time transmissions over one or more channels in order to provide relevant data to be used with real time Quality of Service (QoS) applications.

It is yet another object of the present invention to manage in real time the UpLink QoS of one or more of UpLink content sources sharing in part or in full network resources It is yet another object of the present invention to provide a management system for managing in real-time data transmitted from multiple sources in multiple channels.

In one aspect, the present invention relates to a live uplink transmission and broadcasting management system for managing a plurality of live uplink transmissions and broadcasting events, the system comprising:

(i) a publication portal for publishing transmissions of live events;

(ii) a database for storing metadata, system data, broadcast data and user data;

(iii) a broadcast manager adapted for receiving and processing in real-time metadata information related to a plurality of live uplink transmission events wherein each live uplink transmission event transmits in a plurality of uplink channels, wherein processed metadata information generate data elements adapted for being used in telecom and datacom real time management applications, said broadcast manager also adapted for updating the publication portal with live event information and (iv) a set of QoS management methods to coordinate the usage of Uplink transmissions based on the received metadata and their processing in the broadcast manager.

The term "publishing a transmission" should be interpreted as to include either streaming the event or publishing a link to a web site where the event can be viewed there.

In one embodiment of the present invention, the metadata information comprises one or more of the following fields: user password, promotional or other code, unit/client unique ID, uplink transmission unique ID, service type, modem IDs, ESN's, SIM numbers, date and time, reporter name, one or more keywords describing the uplink transmission, camera/unit location, cellular and wireless network identifications and/or status and/or parameters, performance data, quality (QoS) data, video related parameters, geo-location information, referral to broadcaster web, referral to a reporter web site, referral to content owner, or referral to an advertisement.

The term "client" as defined herein means a reporter or content owner or broadcaster. Service type can be, for example, uploading an archive or any file, real time video transmission, etc. Video related parameters can be frame rate, encoding bit rate, aspect ratio, etc. Geo-location information can be obtained from a GPS unit, assisted GPS, via network parameters such as Cell ID or it can be input manually.

In another embodiment of the present invention, the telecom management applications comprise: billing applications, Service Level Agreement (SLA), performance statistics, content statistics, or Quality of Service applications.

In a further embodiment of the present invention, the Service & Quality of Service of each of the live uplink transmission events is adjusted and managed according one or more of the following parameters: the System Level Agreement (SLA) of each client or unit; the real time or near real time conditions of the plurality of channels that each unit uses or may use; the real time or near real time conditions of all units in an area or sharing part or all of the same uplink resources; historical QoS data and performance behavior and patterns of plurality of live broadcast transmissions previously processed and learnt by the method; the content metadata; the policies imposed by the management method; manual intervention by an operator of the management system; or any combination thereof.

Policies establish how the system should behave and how resources should be allocated and prioritized. For example, based on the commercial terms it can be established that a certain content owner/broadcaster can only operate a certain number of units in a given location, or may use only up to a given bandwidth per unit or per location. Another example of a policy could be a temporary one, for example a limited-time or limited-location allowance of more resources on a promotional basis for specific clients.

The real-time or near real-time conditions of channel refer to parameters such as, but not limited to: network IDs, Cell IDs, network technologies (e.g. HSUPA vs UMTS etc), RSSI (Received Signal Strength), Ec/Io (Signal to noise ratio), Tx power (transmission power), Tx gain (transmission gain), available and used bandwidths, delays, error rates, all in possible terms of current, recent, and various types of averaging functions for each such parameter. That is, the unit may report each of these parameters either as representing the most recent values (e.g the latest delay of each modem), of a simple average function (e.g. the bandwidth per modem averaging the recent 30 seconds), a more complicated average or other function (e.g. the binned levels of error values at 10 seconds bins over the last 1 minute, with standard deviation values).

In an event transmission, the client and unit may have different system authorizations, for example, the unit may be able to perform data uploading only, whereas the SLA may refer to all services including live broadcasting. The real time or near real time conditions include performance parameters such as bandwidth, delay, error rates, etc.

In yet another embodiment of the present invention, the content management applications comprise a programming guide of the plurality of live uplink transmissions and broadcasting events based on metadata sent from the units, information received from the content owner, information received from the reporter, information received from the broadcaster or any combination thereof. The programming guide is dynamically and automatically adapted to the content being transmitted and its associated metadata and parameters.

In yet a further embodiment of the present invention, the programming guide is a TV guide or an Internet broadcasting guide, or an IPTV guide.

In yet another embodiment of the present invention, an end-user (viewer) can query the programming guide or subscribe to receiving alerts from the programming guide or both.

In yet a further embodiment of the present invention, the system is adapted for transmitting metadata and/or data elements to a plurality of third-party servers or portals.

In yet another embodiment of the present invention, the system is adapted for transmitting metadata and/or data elements to a uplink transmission server, said uplink transmission server adapted for receiving, decoding and/or distributing live uplink transmission.

In yet a further embodiment of the present invention, real time or near real time communications are sent to a reporter or to a transmitting client/unit itself.

In yet another embodiment of the present invention, the real time or near real time communications are sent by an end-user or a third party.

In yet a further embodiment of the present invention, uplink transmission events are authenticated.

In yet another embodiment of the present invention, the live uplink transmission and broadcasting management system uses a set of QoS management methods coordinate the usage of Uplink transmissions based also on optimization rules, SLAs, policies or any combination thereof.

In another aspect, the present invention relates to a live uplink transmission and broadcasting management method for managing a plurality of live uplink transmissions and broadcasting events, the method comprising the steps of:

(i) receiving metadata information related to a plurality of live uplink transmission events wherein each live uplink transmission event transmits in a plurality of uplink channels;

(ii) processing in real-time the received metadata information;

(iii) generating from the processed metadata information data elements adapted for being used in telecom and datacom real time management applications; and (iv) generating from the processed metadata information data elements adapted for being used in content management applications.

MODES FOR CARRYING OUT THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

In order to transmit and broadcast live events it is possible to use multiple devices ranging from cameras to cell phones, and transmit their output to a broadcast server. Yet another case uses multiple uplink channels to upload content to a dedicated server over a single or multiple channels, in a similar manner that data files are transferred in packets in an Internet Protocol (IP) network.

Live events filmed by a camera or any other type of content or data can be transmitted to a server via wireless or wireline communications. Typically, in the field, live events are transmitted via wireless communications. The wireless transmitters can be an independent unit coupled to the camera, or integrated in the camera, such as when an event is filmed by a cellular telephone.

A live uplink transmissions and broadcasting management system of the invention is used in order to manage and optimize one or more simultaneous live events and/or data upload over the said single or multiple channels. Each event can be filmed by one or more cameras. Each camera can transmit (uplink) its content via one or more uplink lines. The uplink lines can be any combination of real and virtual lines. The system of the invention is adapted to manage any data upload in general, and live events transmissions in particular. The specification and claims describe the preferred embodiment of a live uplink transmission system for illustration only, and the term "live events transmission" should be interpreted in the specification and claims to include any data upload.

When a live transmission is started, or shortly before or after the transmission begins, the live uplink transmission and broadcasting management system is updated with relevant parameters of the transmission. For example, a wireless device attached to the camera can automatically update the live uplink transmission and broadcasting management system with relevant transmission parameters. In addition, content parameters can also be updated by the reporter and/or the broadcaster.

The term "metadata" as referred to herein means data about other data or content, for example, keywords describing a certain content. The term "parameter" as referred to herein means characteristics or attributes of the content, for example, usage options parameters may define whether to publish a broadcast or not, links/referrals to web pages where the content may be viewed or streamed from etc.

The different parameters, also known as metadata, can be of different types or categories, such as:

Static, or normally static, parameters, such as but not limited to: camera or unit ID, broadcaster name, content owner ID, verification code or password, etc.

Dynamic camera/unit related parameters, such as but not limited to: geographic location (via GPS or other references), date, local time, time zone etc.

Dynamic content related metadata and parameters, such as but not limited to: keywords related to or describing the transmission, content keywords, location keywords, broadcast keywords, user/viewer keywords, reporter name, messages to users, input of different texts per transmission segment,] online responses to viewers' or content owners' messages, usage options such as whether to publish the broadcast or not, links/referrals to web pages where the content may be viewed or streamed from, etc.

Dynamic parameters pertaining to service and authorizations such as but not limited to: password to receiving service, promotional codes, etc.

Dynamic parameters pertaining to wireless networks, such as but not limited to: wireless system (for example, Edge, HSUPA, WiMax, EVDO-Rev 0/ . . . ) and/or System ID (SID) and/or APN—Access Point Name and cell ID (such as Cellular/Wifl cell IDs), cellular operators, registration status, physical parameters such as RSSI (Received Signal Strength Indication) Ec/Io (signal and noise figures), transmit power; Such metadata information may be provided per a single path/link or for all paths/links.

Dynamic parameters pertaining to the performance of the wireless device such as transmission bandwidth (momentary, average, other), delay, error rate, performance jitters etc. Such information may be used per a single path/link or for all paths/links.

In one embodiment of the present invention, static data is stored in the content transmission unit (such as a wireless device or a microprocessor board) in its non-volatile memory. Examples of such static data may include camera ID, broadcaster ID, etc. A user interface, for example a Graphical User Interface (GUI) enables the reporter to input relevant data such as keywords and metadata pertaining to each live event to be transmitted. The content generator or content transmitter may contain a GPS, or obtain the location information from the wireless network. Metadata is sent to the live uplink transmission and broadcasting management system typically at the beginning of the transmission. Metadata transmission may also be requested or initiated by the reporter or the operator of the content generator or content transmitter. Metadata may be sent via any combination of wireline and wireless connections to the live uplink transmission and broadcasting management system. Such connections may go through the Internet, use other private or public connections or any combination thereof. Optionally, metadata information may be encrypted.

Metadata information may be transmitted in part or in full over multiple wireline and wireless network paths in order to optimize the transmission and ensure its reception as well as provide a first level of privacy and encoding. The metadata information may be directed to some of the network paths based various performance conditions. For example, if a certain network path/link is regarded of lower quality/performance for the transmission itself, then such path/link may be used more for sending metadata as opposed to sending the content itself. The metadata information may be sent in a dynamically changing frequency depending on the changing information, its importance, and its importance relative to the transmission itself and the available performance of the various network links/paths established by the content transmitter. That is, sending the metadata and parameters is a dynamic process depending on the importance and size of the content and metadata, and the channels/links performance at every given moment. For example, if the transmitting system is moving, then geo-location information, such as derived from a GPS and/or from the wireless network (cell ID, assisted GPS etc.), may be sent in a dynamically changing frequency. If there is sufficient bandwidth available for both content and GPS, then the GPS data shall be sent. However, if the transmitting system wanted to send GPS data, defined as a low priority parameter (say at every 10 seconds or every 100 meters of change), then if there is not sufficient bandwidth for transmitting both content and parameters, then sending the GPS parameter at the planned point in time may be postponed or cancelled until resources become available for this lower priority information. At the same time, if a Cell ID change is defined as a high-priority parameter, then this information may be sent even at the expense of the content because it may be considered more important and shorter message. Some of the metadata information may be sent periodically or upon triggers, such as when the reporter types in more keywords or messages, when the content transmitter detects a change in its location, in network parameters, in performance parameters, or upon triggers pertaining to such parameters changes (such as when the bandwidth available from a certain cellular operator drops down).

When the live uplink transmission and broadcasting management system receives metadata information, it may authenticate the content transmitter (wireless device), validate its authorizations and update the relevant database. The live uplink transmission and broadcasting management system may translate indirect wireless networks information such as cellular Cell ID to geographical information. It may then automatically update the referral portal with the relevant information including a referral to the broadcaster and/or reporter web sites or other broadcasting feeds. The live uplink transmission and broadcasting management system matches the metadata information against the broadcaster's data in its database. It alerts the broadcaster via its preferred methods (such as email, Short Messages (SMS), Real Simple Syndication (RSS), and Tweeter™ etc). The live uplink transmission and broadcasting management system may coordinate dynamic information with the broadcaster site or manually for various parameters, allowing the broadcaster or owner site to change, add or delete what the reporter has entered. Such parameters may be adding/editing the parameters received from the content transmitter (wireless device) or the reporter, or new information. For example, the content owner/broadcaster may update the referral link to its live broadcasts that appear in the aggregating portal, some or all of the keywords, add advertisements, add information it obtains from analyzing the video content, etc. The system also matches the metadata information against the information database about its users and acts accordingly, such as sending alerts via SMS, Tweeters/RSS/emails etc to users that requested to receive such alert when a certain broadcast identified via any combination of the parameters is updated (such as from a certain reporter and/or on a certain IPTV channel and/or matching a certain keyword and/or from a certain geographical location area etc).

The live uplink transmission and broadcasting management system comprises a publication portal module for publishing the transmissions of the live events. The publication portal may look like a TV guide with timeslots dynamically updated as the live broadcasts progress. Each timeslot is actually a referral to a web site where the broadcast actually is streamed from. Alternatively, the streaming web site may belong to other sources such as the broadcaster, the reporter, a blog, etc. Timeslots and broadcasts may be filtered or queried by the viewer according to different criteria such as keywords, metadata, geographical location area or any other available field.

In another embodiment of the present invention, measuring, accounting and billing functions are activated when viewers use the referral links to the actual streaming web site in order to track and optionally charge the viewer for viewing the streamed content.

In another embodiment of the present invention, the live uplink transmission and broadcasting management system provides additional services to the users (viewers), reporters and/or broadcasters. For example, the publishing portal may allow authorized users to have a live chat with the reporter or exchange messages between themselves or allow any other form of communication between the users and the reporter.

In a further embodiment of the present invention, another value-added service allows the reporter and/or broadcaster to publish polls to authorized users, to allow users to vote using SMS or internet on published questions, to send the results to the broadcaster and/or reporter.

Another value-added service provides measurement and statistical information about users of the system. Such information may include but is not limited to: the number of users of the system at any given time point, the types of users, the origin of users, usage and popularity of each referral hyperlink, usage and popularity of any other of the available portal services. The collected statistical data can be then used for billing, management, advertisement and performance purposes or applications.

Another value-added service provides a broadcaster or content owner with real time and historical information in various formats (such as Excel, database, various GPS formats, binary encodings, text, XML, HTML, PDF etc.) about its transmissions. For example, the current geographic location of its reporters; the content (keywords) transmitted from each event; the usage profile of each content transmitter; statistics for inventory, profiling and cost-effectiveness analysis; the viewers' usage pattern of each reporter/keyword to build links between transmissions for real time and offline use (based on geo-location, keywords and other content related parameters) etc.

Quality of Service (QoS) covers a whole range of techniques that match the needs of service requestors with those of the service provider's based on the available resources of one or more networks. QoS is a set of technologies for managing network traffic in a cost effective manner to enhance user experiences based on the constraints of costs and SLAs. QoS technologies allow to measure bandwidth, detect changing network conditions (such as congestion, availability of bandwidth, change in delay), and prioritize or throttle traffic. The live uplink transmission and broadcasting management system uses prior information provided by the content transmitter or other content transmitters and stored in its database for QoS management and coordination. Such prior information may include knowledge about the Cell ID, maximum capacity observed by the transmitter, typical behavioral patterns, etc. Further, the system may use real time or near real time information from several content transmitters transmitting from the same area and using same or close resources (such as same or close-by Cell ID's). For example, when there are several content transmitters (different units) uploading and/or transmitting from the same location, the units are actually competing with one another and with other uses of the networks they use over limited resources such as Uplink bandwidth. In such a case, in order to enable units to work from the same location, and in order to comply with SLAs for the different content transmitters from that location, the system may instruct one of the content transmitters transmitting from the same location to stop using a specific path/link, limit its use on several other links, limit the overall or partial usage of a QoS resource such as the video encoding bit rate or frames per seconds, etc.

The input for these system decision algorithms may include several parameters such as the performance and transmission information reported by some or all the relevant content transmitters transmitting on the same Cell ID or geo-location information; or other prior knowledge about that Cell ID; algorithms and patterns identified by the system itself, such as if the system identifies that a certain content transmitter is driving in a certain direction.

Additionally, a different type of input information for these decision algorithms is derived from commercial information and rules, such as data about the content transmitter or the content owner of all the content transmitters in an area. Examples of such data comprise: Service Level Agreements (SLA); known streaming QoS of the relevant content owners (allowing the system to limit transmission according to the streaming quality); or various policies and marketing campaigns. The system may also store any such reported information (wireless or other networks parameters, transmission performance per path/link and overall from one or more content transmitters) along with information about day-time-holidays along with information such as the type of location (rural, business, highway, etc), for off line analysis and for later knowledge and use about that Cell ID, overall cellular network performance analysis, etc.

Figure 1:
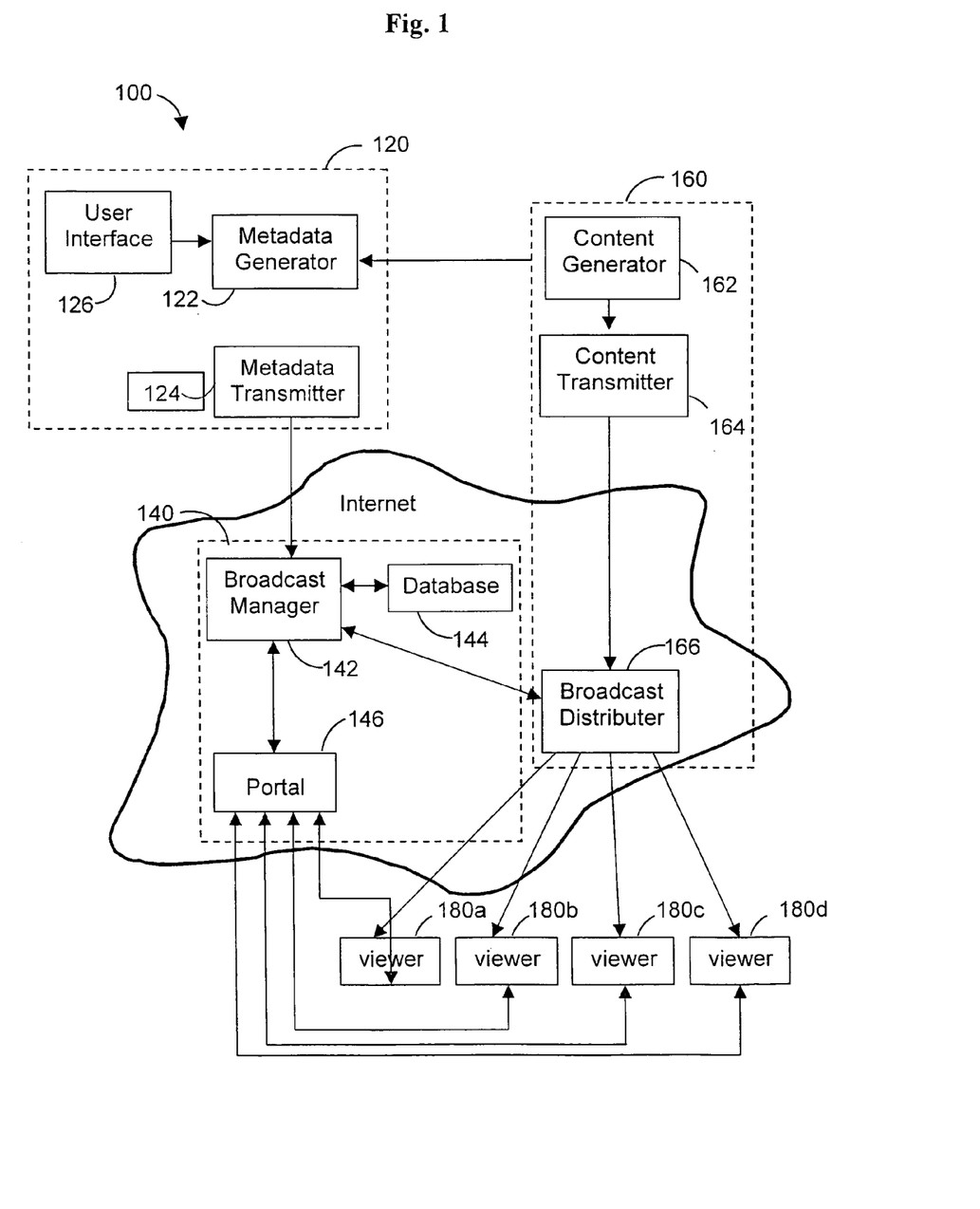
FIG. 1 is a block diagram showing the main features of the content transmission management system.

Reference is now made to FIG. 1, which is a block diagram representing schematically the main features of the content-transmission management system 100 according to a first embodiment.

The content-transmission management system 100 of the first embodiment typically serves to manage content transmitted by a content-transmission system 160 such as that described in the applicants co-pending patent application U.S. Ser. No. 11/845,071, incorporated herein by reference, or any other live uplink transmission application. The content-transmission system 160 may include a content generator 162 such as mobile phone, camera or the like, and a content transmitter 164 such as a transmitter of electromagnetic radiation. The content transmitter 164 typically sends the content to a broadcast distributor 166 via satellite link or a terrestrially based intercommunications network such as a mobile phone network for example. The broadcast distributor 166 may distribute the content to at one or more viewers 180. The exemplary embodiment described herein refers to a broadcast distribution however it is noted that the content-transmission management system 100 may be used for narrowband, point to point or any other data-content streaming.

The content-transmission management system 100 according to the first embodiment is divided between a remote unit 120 and a web-based unit 140. The remote unit 120 includes a metadata generator 122 in communication with the content generator 162, a metadata transmitter 124 and optionally a user interface 126, typically a keyboard, touch screen or the like. The remote unit 120 is configured and operable to generate metadata related to a live broadcast (or any other content or data) and transmit it to the web-based unit 140.

The web based unit 140 comprises a broadcast manager 142, a database 144 and user portal 146. The broadcast manager 142 is typically dedicated management software configured and operate to receive the metadata from the metadata transmitter 124. Upon reception of metadata, the broadcast manager 142 may perform any of a number of actions. A first action may be to authenticate, and authorize the broadcast.

A second action may be to update the database 144 with the received metadata. A third action may be to update the user portal 146 which is accessible by the viewers 180.

The user portal 146 may, for example, display a list of current live broadcasts categorized and indexed by their metadata. The list may also include links or referrals to other websites or broadcasters such as television channels which host or stream the broadcast itself.

The broadcast manager 142 may additionally provide alerts to potential viewers 180 via email, text messaging, RSS, SMS or other messaging service. Viewers may subscribe to such services and register individual or group preferences for alerts according to various metadata fields. Moreover, the broadcast manager 142 may open communication channels for the viewers 180 such as chat rooms or the like for the viewers 180 to communicate between themselves or with the provider of the broadcast, for example a reporter. The broadcast manager 142 may further log usage statistics related to a broadcast and update the database 144 therewith.

Figure 2:
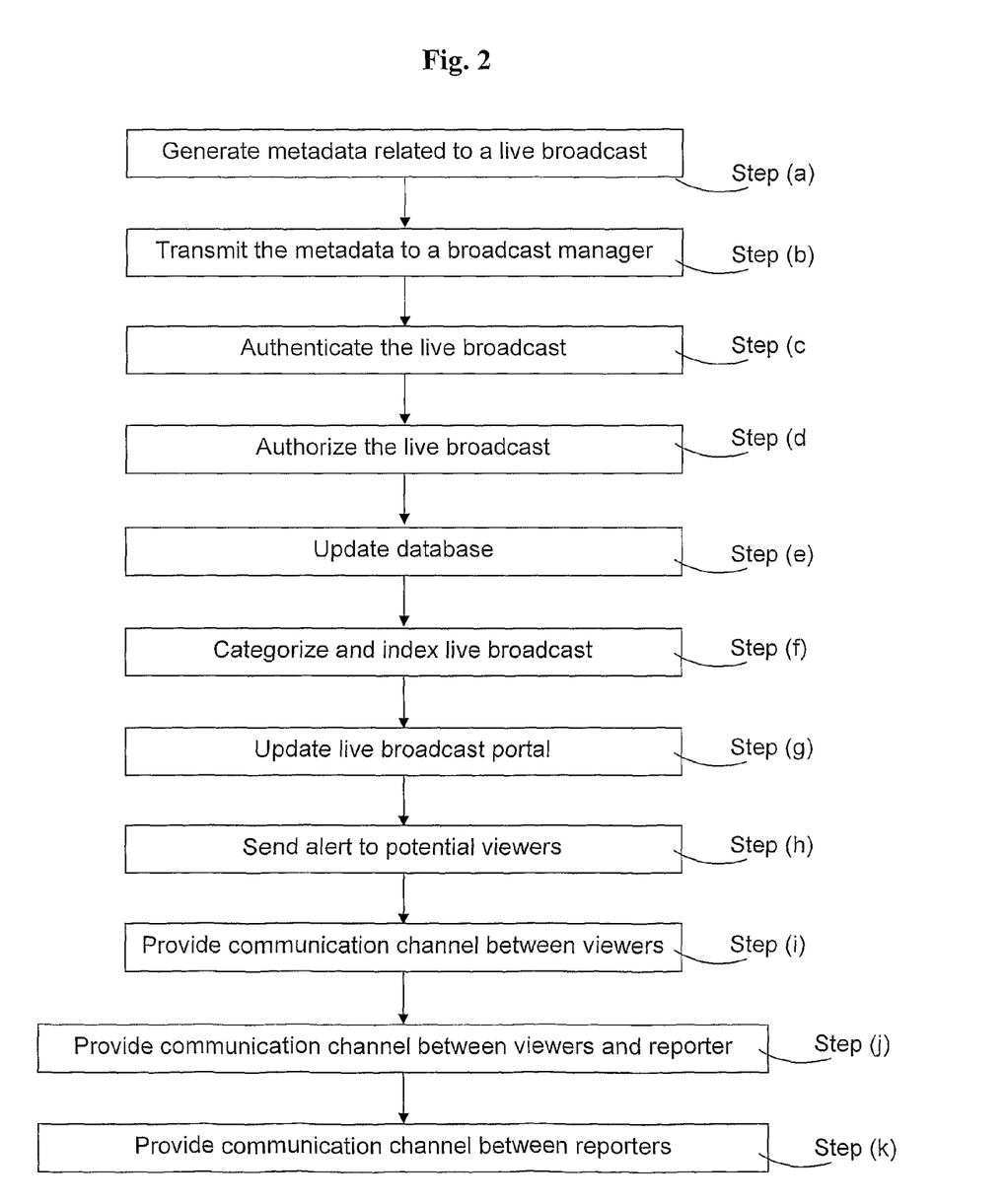
FIG. 2 is a flowchart showing the main steps of a method for managing the transmission and distribution of live multimedia broadcasts.

With reference now to FIG. 2, a flowchart shows the main steps of a method for managing the transmission and distribution of live-broadcasts of multimedia content. The method comprises the following steps which may be performed in any order:

Step (a) generating metadata related to a live-broadcast;
Step (b) transmitting the metadata is to a broadcast manager 142;
Step (c) (optional) authenticating the live-broadcast;
Step (d) authorizing the live-broadcast;
Step (e) (optional) updating a database 144 with the metadata;
Step (f) categorizing and indexing the live broadcast;
Step (g) updating a user portal 146 with details of the live-broadcast;
Step (h) (optional) sending alerts to potential viewers 180 of the live-broadcast;
Step (i) (optional) providing a communications channel between viewers 180;
Step (j) (optional) providing a communications channel between viewers 180 and reporters, and
Step (k) (optional) providing a communications channel between reporters for coordinating a plurality of live broadcasts and the like.

It is noted that steps (a) and (b) may be performed in a continuous manner before, during and after the live transmission. Additional steps of the method will be apparent from the description herein. These may include, for example, providing communication channels between the portal 146 and a broadcast distributor or broadcast manager 142 (such as CNN for example) and the portal 146 interacting with the viewers 180 and or the broadcast manager 142 or distributor.

Figure 3:
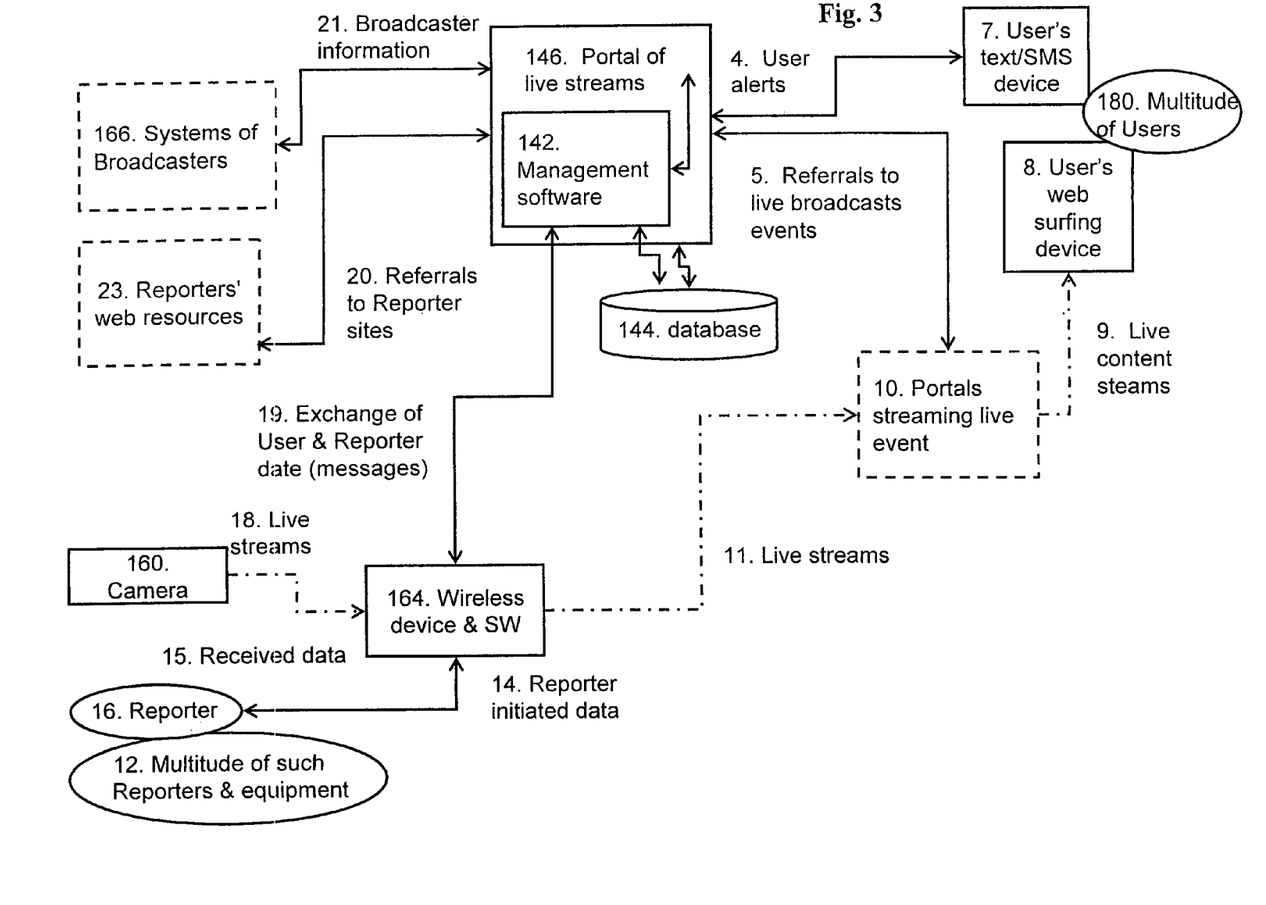
FIG. 3 is a block diagram of a management system.

Reference is now made to FIG. 3 where a block diagram representing an exemplary management system is presented. When a live transmission is started 11, or alternatively either before or after the transmission, a remote device 164, which is preferably adapted to transmit a signal wirelessly, is attached to a camera, audio device or any other content generator device 160, generates metadata labels associated with the live transmission and updates the broadcast management software 142 with various parameters.

Possibly appropriate Metadata parameters may include, but are not limited to: camera 160 location, reporter name, broadcaster name, camera 160 ID, date and time at the camera 160 location, password for receiving services, referral to the broadcaster web site or other advertisement, referral to the reporter web site or other advertisement, etc. Optionally the remote unit 164 additionally includes a user interface 126 with which a user such as a reporter 16 and/or broadcaster 166, may manually add further metadata parameters.

The wireless device 164 may store constant data such as the camera 160 ID, the broadcaster ID, etc. Optionally a user interface 126, typically including a Graphical User Interface (GUI) and keyboard, or a touch screen are provided for the reporter 16 to input data such as keywords and metadata pertaining to each event and transmission 11. The wireless device 164 may contain a locating device such as a GPS locator for example. Alternatively data identifying its location may be obtained from the cell of the cellular network used, or by triangulation from antennae, and the like. Then, at the reporter's 16 manual request or automatically at the beginning of the transmission 11, it the wireless device 164 may send this data or any part of it 19 via wireline or wireless connection to the management software 142. In certain embodiments the information may be encoded and/or transmitted over multiple wireline and wireless networks in order to ensure its reception.

When the management software 142 receives this information, it may inter alia authenticate the wireless device 164, validate its authorization and update its database 144. It may then automatically update the referral portal 146 with the relevant information including a referral 5, 20 to the web sites 23 of the broadcaster 21 and/or reporter or any other broadcasting feeds 10. It may match the information against the broadcasters data in its database 144. It may alert the broadcaster 21, 166.

The management software 142 may further coordinate dynamic information with the broadcaster 166, 21 site or manually for various parameters. Such parameters may be the parameters received from the wireless content creating device—camera 160 and the operating reporter 16, or further information. For example, the broadcaster 166, 21 may update the referral link to its live broadcast that appears in the aggregating portal 146, some or all of the keywords etc.

The management software 142 may also match the information against information about its users/subscribers/audience from its database 144 and act accordingly. For example alerts may be sent, for example via SMS, email or the like, to potential viewers 180, 7, 8 that may have requested to receive such alert when a certain transmission 11 is updated which may be identified via any combination of the parameters (such as from a certain reporter 16 and/or on a certain internet TV, IPTV channel and/or matching a certain keyword and/or from a certain geographical location area etc. Alerts may contain links or referrals 5, 20 to the relevant live broadcasts that may themselves be streamed from another source (for example a TV station, some internet TV, IPTV channel etc 10).

Publication on the portal 146 may look like a TV program guide with timeslots dynamically and automatically updated over time as the live transmissions 19, 21 progress. Each timeslot may serve as a referral 5, 20 to another site from which the transmission itself is streamed 10, or that belongs to the broadcaster and/or reporter 23. Other referrals 20 may be to the reporters web site, blog, etc. Timeslots and broadcasts may be filtered and sorted according to keywords, metadata, geographical location area or any other information according to the users preference.

The management software 142 may additionally provide additional services to the audience, reporters and/or broadcasters. The aggregating portal 146 may allow authorized audiences 180 to have a live chat with the reporter and/or exchange messages and/or any other relevant communication 15 between audiences and the reporter 16 via the wireless device 164 or other communication media. Another service allows an audience 180 to build dynamic or static social communities around a certain live stream, a reporter 16 or any other entity of the portal 146. Users 180 may chat with one another and or the reporter 16, during the live stream 11 or afterwards and may be connected to other communities, for example.

Still another service allows users 180 and/or broadcasters 166 and/or reporters 16 and/or any subgroups of the above, to rate or rank live-broadcasts before, during or after streaming according to various categories. Such rankings may be published, and may be used for example to monetize the broadcasts.

A further service allows the reporter 16 and/or broadcaster 166 to publish polls to authorized audiences 180, to allow audiences 180 to vote using SMS or internet on published questions, to send the results to the broadcaster 21, 166 and/or reporter 16.

Another service provides counting and statistical information, such as the size of the audience 180, the character of the audience 180, the geographical location of the audience 180 and the like as well as the source of each referral hyperlink 5, 20 or any other of the portal service, which may be used to automate a billing system factoring in these numbers.

Yet another service provides the ability to match advertisement and other solicited or unsolicited information against any of the parameters of the multimedia content itself 19, the reporter 16, 23, the broadcaster 166, and/or each member of the audience 180. The platform may insert of advertising to each referral, be it over SMS web based email or any other communication service, or to the portal 146 interface that each member of the audience 180 views.

Still another service allows freelance or other reporters to commercialize the live streams (or stored streams of a previously recorded). The platform management software 142 and database 144 may be used to offer streamed broadcasts for sale to a limited or unlimited group of either broadcasters 166 or other audience 180, negotiate prices manually or automatically for example using various auction mechanisms supported by the platform.

In a further embodiment of the present invention, the management software 142 allows the management of service and QoS of each transmission device 164 such as to limit its use of certain uplink resources or networks 12 and the parameters of each such service 14 such as limiting the video encoding bit rate or the Frames Per Second encoding. The management SW 142 may decide to manage such QoS when it is triggered to do so by alarming metadata such as reporting on multiple transmission devices 164 using the same networks resources 12 along with its own Policies and marketing campaigns. Alarming metadata refer to metadata that when a certain value or threshold is reached, the remote unit 120 or the management software 146 or both) will activate an alert that will trigger one or more defined actions in the system in order to signal and/or attempt to repair a problem. Such alarming metadata include a sudden drop in bandwidth in a certain network or modem, or a sudden increase in delay above certain threshold, etc.

In other embodiments of the invention, the platform contains management software 142, a database 144 and a portal of referrals 5 to live multimedia streams 10 generated by reporters 16 in the field via various wireless and other transmission devices 164, as well as other content related to those streams, such as reporters web sites 23 and/or broadcasters 166.

According to various embodiments the invention includes a protocol 19 for updating the portal with data from the wireless device and software 164 and from the reporter 16, 14. Such data may include identity information of the reporter 16, of the wireless device 164 and software, of the broadcaster 166 that the device 164 or reporter 16 belong to/affiliate with. It may contain location information such as GPS or another form of cellular LBS data from the device 164 or external sources. It may contain data of the relevant transmission identity, type and parameters. It may contain data that the reporter 16 had entered manually such as transmission name, any keywords, metadata describing the transmission type and/or the content such as topic related, personal data, broadcaster related data. The broadcaster 166, or the rights owner to that live multimedia content stream 11, may edit these parameters, manually or automatically via a software that resides on its systems 166. For example, the broadcaster 166 such as a national TV network may add to the information 19 received from the reporter 16 some data that it automatically generates when one of the metadata keywords in this reporter's 16 information are politics and China. This broadcaster's edited information 21 may then be sent to the management software 142 of the portal 146 using the protocol 21. The management software 142 may add this information to the portal 146 and/or to the referrals 5, 20 or to any other content generated or handled by it.

An audience 180 may include subscribers to the portal 146 as well as unsubscribed users. Audiences 180 may enter the portal 146 and be referred 5 to current live multimedia content streams 11 occurring in other portals or web pages 10. The portal 146 and the management software 142 may perform accounting of the referrals 5, 20 for various purposes such as billing related to the referral, statistics, performance analysis, polls of audience 180 preferences and behaviors etc.

The audience 180 may be authorized to interact with the reporter 16 live, that is in real-time or near-real time. The management software 146 may authorize some audience 180 to send SMSs, instant messaging, etc to the reporter 16. These audience 180 inputs may eventually travel to the reporter 16 over the system dedicated channel and protocols 19, 15 or via standard communication paths (such as SMSs). The audience 180 need not know the reporter's 16 details since the system may hide it from them to simplify the connection, to save operation costs or to provide a seamless integrated and standard platform for such communications. The software management 164 may authorize an audience 180 to engage in various standard communications such as instant messaging, forums, chats etc based and related to the multimedia content streams 11.

Furthermore in other embodiments, the software management 142 is capable of managing services on several portals, such as the portal 10 from which the multimedia stream 11 is being transmitted, the broadcaster's portals 166 or the like.

At any point in time, typically during the live content multimedia streaming, the reporter 16 may update the information sent to the management software 142 and respond to communications from members of the audience 180 using the protocol 19.

It will be appreciated that various embodiments of the present invention may have many advantages over the known art. Some such advantages may be selected from the list below in a non-limiting manner.

A new platform and service for publication and referral of live high quality multimedia material 11 suited to a new generation of devices 164 powerful enough to generate such live content 11.

In addition, this platform and services allow members of an audience 180 to be alerted as well as receive live content from all over the world matching various criteria according to their own selections and preferences.

Furthermore the system allows the audience 180 to monitor all live transmissions 11 from a single web page 146, removing the need for surfing from one web site to another.

The system also allows the owners of the rights to the transmissions, the traditional broadcasters 166, or other content distributors to own and distribute the content from their own site. The system provides a reference service for referring audience to these sites, TV channels, internet TV, IPTV channels, internet portals or any other distribution channels.

A new platform and service for publication and referral of live high quality multimedia material 11 suited to a new generation of devices 164 powerful enough to generate such live content 11.

In addition, this platform and services allow members of an audience 180 to be alerted as well as receive live content from all over the world matching various criteria according to their own selections and preferences.

Furthermore the system allows the audience 180 to monitor all live transmissions 11 from a single web page 146, removing the need for surfing from one web site to another.

The system also allows the owners of the rights to the transmissions, the traditional broadcasters 166, or other content distributors to own and distribute the content from their own site. The system provides a reference service for referring audience 180 to these sites, TV channels, internet TV, IPTV channels, internet portals or any other distribution channels.

The system also allows automatic or manual management of service and QoS of units 120 transmitting live in the uplink upon detection of problems or potential problems as reported in metadata and parameters by one or more of the units 120 and/or by predictions deduced by this new platform based on non-problematic metadata and parameters provided by these units 120. All this done without information normally available within the network operators themselves, yet not made public or shared externally in any way. The platform further allows such QoS management to incorporate policies and marketing campaigns and prioritizations to distinguish service types and between clients and/or other criteria. Further, such coordination allows storing the decisions and results, allowing future improved decision making by the system. Such coordination allows resolving congestions, provides graceful degradation in QoS, resolving uplink resource over-utilizations, and optimizes the overall usage of the uplink shared in part or in full in one or more networks by several units using this service or due to uplink usage caused by other users.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

The invention claimed is:

1. A live uplink transmission management method for managing in real time, by a broadcast manager, a plurality of simultaneous live uplink transmission events between a plurality of remote content sources and a plurality of broadcast distributors separate from the broadcast manager, each transmission event including wireless transmission of real time content over one or more wireless channels from a remote content source to a broadcast distributor, the method comprising the steps of:
   (i) receiving at the broadcast manager, metadata information describing the transmission of the real time content of the plurality of live uplink transmission events, without receiving at the broadcast manager the content of the uplink transmission events, the metadata information originated from a plurality of the content sources;
   (ii) processing in real-time, by the broadcast manager, the received metadata information; and
   (iii) managing, by the broadcast manager, the transmission of at least one of the plurality of live uplink transmission events, from the respective content source to the respective broadcast distributor, based on the received metadata of a plurality of the uplink transmission events and their processing,
   wherein processing the received metadata information comprises identifying network congestion or over-utilization and wherein managing the transmission comprises providing instructions in response to the identified congestion or over-utilization, and
   wherein the receiving, processing and managing are performed by the broadcast manager, which is separate and remote from the content sources and broadcast distributors.

2. A live uplink transmission management method according to claim 1, wherein the metadata information comprises one or more of the following fields: user password, promotional or other code, content source unique ID, uplink transmission unique ID, service type, modem IDs, ESN's, SIM numbers, date and time, reporter name, one or more keywords describing the uplink transmission, content source location, cellular and wireless network identifications and/or status and/or parameters, performance data, quality of service (QoS) data, video related parameters, geo-location information, referral to broadcaster web, referral to a reporter web site, referral to content owner, or referral to an advertisement.

3. A live uplink transmission management method according to claim 1, comprising generating from the processed metadata billing data, performance statistics or content statistics.

4. A live uplink transmission method according to claim 2, wherein the Quality of Service of at least one of the live uplink transmission events is adjusted and managed according to one or more of the following parameters: the System Level Agreement (SLA) of at least one client or content source; the real time or near real time conditions of the plurality of channels that at least two content sources use or may use; the real time or near real time conditions of all content sources in an area or sharing part or all of the same uplink resources; historical QoS data and performance behavior and patterns of plurality of live broadcast transmissions previously processed.

5. A live broadcasting management method according to claim 1, comprising generating from the processed metadata, real time programming guide of the plurality of live uplink transmissions and broadcasting events.

6. A live broadcasting management method according to claim 5, wherein the programming guide is a TV guide or an Internet broadcasting guide, or an IPTV guide.

7. A live uplink transmission management method according to claim 5, comprising subscribing by the end user to receive alerts from the programming guide.

8. A live uplink transmission management method according to claim 1, comprising transmitting one or more metadata and/or data elements from the broadcast manager to one or more third-party servers or portals.

9. A live uplink transmission management method according to claim 1, comprising transmitting metadata and/or data elements to a uplink transmission server, said uplink transmission server adapted for receiving, decoding and/or distributing live uplink transmission.

10. A live uplink transmission management method according to claim 1, comprising sending real time or near real time communications to a reporter or to a transmitting content source itself.

11. A live uplink transmission management method according to claim 10, wherein the real time or near real time communications are sent by an end-user or a third party.

12. A live uplink transmission management method according to claim 1, further comprising the step of authenticating uplink transmission events.

13. A live uplink transmission management method according to claim 4, wherein one or more of the parameters are provided by content sources.

14. A live uplink transmission management method according to claim 4, wherein the parameters with respect to the real time or near real time conditions of the at least one of the plurality of channels are selected from a set of the parameters consisting of dynamic parameters pertaining to wireless networks, System ID (SID), Access Point Name (APN), cell ID, cellular operator, registration status, physical parameters, dynamic parameters pertaining to performance of a wireless channel, device ID, date and time, location information, quality (QoS) data, signal information, and noise information.

15. A live uplink transmission management method according to claim 3, wherein generating from the processed metadata billing data, performance statistics or content statistics is performed by a management application run by one or more third-party servers or portals, which receive the metadata from the broadcast manager.

16. A live uplink transmission management method according to claim 1, and comprising at least one of resolving congestion, providing graceful degradation in QoS, resolving uplink resource over-utilization, and optimizing overall usage of a shared uplink using the received metadata information by using real time or near real time information from several content, sources transmitting from a same area and using same or close network. resources, in order to enable units to work from the same area.

17. A live uplink transmission management method according to claim 1, wherein the metadata information is received by the broadcast manager from at least one connected content source at a dynamically-changing frequency depending at least on the metadata information and on available performance of at least one of the channels of the at least one connected content source.

18. A live uplink transmission management method according to claim 1, wherein the content management applications include data upload operations.

19. A live uplink transmission management method according to claim 1, wherein generating the information data elements comprises updating at least one participant selected from a group of participants consisting of broadcasters, transmitters, content owners, and reporters, with respect to at least one information parameter selected from the group of information parameters consisting of a number of users of a system at any given time, types of the users, an origin of the users, usage and popularity of referral hyperlinks, usage and popularity of available portal services, and real time and historical information about transmissions.

20. A live uplink transmission management method according to claim 1, wherein generating the information data elements comprises providing real time and historical information in a format selected from a group of formats consisting of spreadsheet, database, geographical information system, binary encoding, text, markup language, and image formats.

21. A live uplink transmission management method according to claim 20, wherein the information data elements contain information selected from a group of information types consisting of a current geographical location of a reporter, content transmitted from at least one event, a usage profile of at least one content source, statistics for inventory, profiling and cost-effectiveness analysis, and viewers' usage patterns.

22. A live uplink transmission management method according to claim 1, wherein generating the information data elements comprises instructing a content source to modify a transmission by means of an action selected from a group of actions consisting of stopping to use a specified channel, limiting use of one or more channels, and limiting usage of a QoS resource.

23. A live uplink transmission management method according to claim 1, and comprising commercializing and monetizing live or stored streams relating to the transmission events by offering streamed broadcasts for sale to a limited or unlimited group of either broadcasters or other audience, negotiate prices manually or automatically for example using various auction mechanisms supported the platform.

24. A live uplink transmission management method according to claim 4, wherein the broadcast manager implements policies for managing multiple live event transmissions from a same area, which include establishing how transmission resources should be allocated and prioritized by the broadcast manager.

25. A live uplink transmission management method according to claim 24, wherein the policies are selected from policies based on commercial terms and temporary policies.

26. The method of claim 5, wherein the programming guide includes for at least one transmission event a referral to another site from which the transmission itself is provided.

27. The method of claim 1, comprising sending from the broadcast manager to one or more of the content sources, instructions which prioritize or throttle traffic from one or more of the content sources, based on the received metadata.

28. The method of claim 27, wherein the instructions, which prioritize or throttle traffic from a single content source, are based on metadata from several content sources transmitting using at least partially shared uplink resources.

29. The method of claim 1, wherein managing the transmission of at least one of the plurality of live uplink transmission events comprises managing the usage of one or more of a plurality of modems of at least one of the content sources, according to the processed metadata.

30. The method of claim 1, comprising generating by the broadcast manager, instructions on a video encoding bit rate or a number of frames per second transmitted from one of the content sources, based on the received metadata.

31. The system of claim 1, comprising generating in real time, by the broadcast manager, alerts to potential viewers of transmissions from live content sources, based on matching of user preferences to fields of the received metadata.

32. The method of claim 31, wherein the alerts for specific metadata information are transmitted to potential viewers that provided keywords, matching keywords in the metadata information.

33. The method of claim 31, wherein the alerts for specific metadata information are transmitted to potential viewers selected based on a geographical location of the content source generating the transmission event corresponding to the metadata information.

34. The method of claim 1, comprising providing by the broadcast manager references to distribution channels of sites of broadcast distributors of video streams identified by metadata.

35. The method according to claim 1, comprising transmitting the metadata from the broadcast manager to the broadcast distributors.

36. A live uplink transmission method according to claim 3, comprising adjusting the quality of service of at least one of the transmission events, by the broadcast manager, responsive to the metadata information.

37. A live uplink transmission method according to claim 36, wherein adjusting the quality of service of at least one of the transmission events comprises optimizing one or more simultaneous live events from the same area and/or data upload over said channels.

38. A live uplink transmission method according to claim 36, wherein adjusting the quality of service of at least one of the transmission events comprises optimizing an overall usage of the uplink shared in part or in full in one or more networks by several content sources using this service or due to uplink usage caused by other users.

39. A live uplink transmission method according to claim 36, wherein adjusting the quality of service of at least one of the transmission events comprises at least one of resolving congestions, providing graceful degradation in QoS, resolving uplink resource over-utilizations, enabling multiplicity of content sources to transmit from the same location, instruct one of the content sources transmitting from the same location to stop using a specific path/link, limit its use on several other links, limit the overall or partial usage of a QoS resource.

40. A live uplink transmission method according to claim 1, comprising establishing communication connections between the broadcast manager and the broadcast distributors and wherein receiving the metadata by the broadcast manager comprises receiving over the established communication connections.

41. A live uplink transmission management method according to claim 7, wherein the alerts comprise at least one of SMS, Twit, RSS feed or email.

42. The method of claim 1, comprising instructing one of the content sources, by the broadcast manager, on usage of at least one of the channels, based on the received metadata.

43. The method of claim 1, wherein managing the transmission of at least one of transmission event comprises providing an instruction on an amount of bandwidth the at least one transmission event may use.

44. The method of claim 1, wherein the at least one transmission event uses a plurality of transmission links and wherein managing the transmission of at least one transmission event comprises providing an instruction on usage of a specific transmission link.

45. The method of claim 1, wherein managing the transmission of at least one of the plurality of live uplink transmission events comprises setting a limit on usage of one or more transmission resources.

* * * * *